United States Patent
Williams et al.

(10) Patent No.: US 8,103,043 B2
(45) Date of Patent: Jan. 24, 2012

(54) SOUND-GENERATION ARRANGEMENTS IN PORTABLE ELECTRONIC DEVICES

(75) Inventors: Greg Williams, San Diego, CA (US); Alex Dekoster, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 594 days.

(21) Appl. No.: 12/371,512

(22) Filed: Feb. 13, 2009

(65) Prior Publication Data

US 2010/0210298 A1   Aug. 19, 2010

(51) Int. Cl.
*H04R 25/00* (2006.01)
(52) U.S. Cl. .................. 381/388; 381/333; 381/337
(58) Field of Classification Search .................. 381/306, 381/332–334, 337–339, 365, 388
See application file for complete search history.

(56) References Cited

U.S. PATENT DOCUMENTS

| | | | |
|---|---|---|---|
| 4,391,532 A * | 7/1983 | Hara | 381/396 |
| 2005/0226454 A1 | 10/2005 | Lam et al. | |
| 2007/0275769 A1 | 11/2007 | Ho et al. | |

* cited by examiner

*Primary Examiner* — Suhan Ni

(57) ABSTRACT

A mobile electronic device is provided. The mobile electronic device includes a housing having an ear-facing surface. Also, the mobile electronic device includes an audio transducer disposed within the housing. Further, the mobile electronic device includes an acoustic channel coupled between the audio transducer and the ear-facing surface for transmitting sound waves produced by the audio transducer to external of the ear-facing surface, wherein the audio-transducer having an audio-transmitting plane disposed at an angle other than parallel relative to the ear-facing surface.

20 Claims, 3 Drawing Sheets

SOUND-GENERATION ARRANGEMENTS IN PORTABLE ELECTRONIC DEVICES

FIELD OF THE INVENTION

The invention relates to arrangements and method thereof for reducing the form factor of a portable electronic device.

BACKGROUND OF THE INVENTION

Mobile telephones have long been employed to facilitate communication among users disposed in geographically dispersed locations. In recent years, the "on-the-go" lifestyle has turned mobile telephones from luxury goods to basic necessity items. One reason mobile telephones have become so popular is due to the small form factor. Unlike the earlier models, today's mobile telephones tend to be small, sleek, and ergonomic.

To facilitate discussion, FIG. 1A shows a simple diagram of a cross-sectional view of a mobile telephone 100. Although mobile telephones may have different designs, most mobile telephones have a bar configuration in which components are positioned next to one another mostly in the y-direction. In an example, mobile telephone 100 may have a plurality of components encased within a device housing 102. The plurality of components may include a set of keys 104, a display area 106, an audio transducer 108 (e.g., earpiece), and the like.

Set of keys 104 is usually positioned toward the bottom of mobile telephone 100. Usually, at minimum, set of keys 104 includes the number keys. However, some mobile telephones (e.g., smart devices) offer additional functions (e.g., email function, Internet, music function, etc.) besides voice calls. For these smart devices, a QWERTY keyboard may be provided to enable users to take advantage of these functionalities. Since set of keys 104 is an essential component of mobile telephone 100, set of keys 104 has to be large enough to ensure user's readability and usability. Thus, the form factor of mobile telephone 100 is at least limited by the size of set of keys 104.

Another component that may also affect the form factor of mobile telephone 100 is display area 106, which is usually positioned close to set of keys 104. Display area 106 is usually employed to display instructions, messages, menu items, and the like. Thus, display area 106 has to be large enough so that the user is able to view (e.g., read) the items presented in display area 106.

Positioned toward the top of mobile telephone is an earpiece that enables the user of mobile telephone 100 to hear sound emitted from the device. Those skilled in the art are aware that the sound emitted from the earpiece is usually produced from audio transducer 108, which is typically arranged parallel to an ear-facing surface 112. To produce the sound, audio transducer 108 may include a magnet structure coupled to a coil and diaphragm. When power flows through the magnet structure, the power interacts with the magnetic field produced by the magnet structure to cause the coil to move up and down. In turn, the diaphragm moves, thereby compressing the air in front of the diaphragm to create sound wave. The sound waves travel outward from audio transducer 108 through acoustic channel 110 to reach ear-facing surface 112, which is usually the location at which a user of mobile telephone 100 may place his ear to hear the sound emitted from mobile telephone 100. Since the quality of the sound usually degrades as the size of audio transducer become smaller, the size of audio transducer 108 has a finite size.

As can be seen from FIG. 1A, mobile telephone 100 may require certain components to be functional. Since most mobile telephones have the components positioned next to one another, the size of the components may affect the length of the mobile telephones. Given that the physical size of the mobile telephone is an important consideration in a consumer's purchase of a mobile telephone, most manufacturers try to identify ways to reduce the form factor of the mobile telephone. One method is to reduce the size of the components. However, since most components need to be of a finite size in order to be functional, the size of the mobile telephone has already been limited to the smallest possible size a component can be reduced to without sacrificing function.

One method for diminishing the length of a mobile telephone is to stack the components (as shown in FIG. 1B). Similar to FIG. 1A, mobile telephone 120 may include a plurality of components (a set of keys 124, a display area 126, an audio transducer 128, and the like) encased within a device housing 122. To reduce the length of mobile telephone 120, audio transducer 128 may be partially positioned behind display area 126. Accordingly, the stacked components reduce the length of mobile telephone 120; however, mobile telephone 120 sacrifices its sleek, thin design (i.e., thicker in the z-direction).

Additionally, the longer acoustic channel (130) may cause acoustic performance issue since sound waves tend to degrade as it travels further away from its source. Given the same condition, the quality and/or volume of the sound waves of FIG. 1B is significantly lower than that of FIG. 1A since the sound waves have to travel a further distance in FIG. 1B to reach an ear-facing surface 132. In addition, resonance tends to increase in a longer acoustic channel. Those skilled in the art are aware that sound waves bounce against other surfaces as it travel away from the audio transducer. Thus, as sound waves bounce against the wall of acoustic channel 130, the longer distance travel by the sound waves cause an increase in resonance, which may translate into a less-than-acceptable sound being emitted at ear-facing surface 132.

Another problem with the design of FIG. 1B is that the sound emitted from mobile device 120 may not meet the standard established for a hearing aid compatible (HAC) device. Given that a substantial percentage of the world population requires the assistant of hearing aid devices, mobile telephones that do not meet HAC standard may result in market share loss to the manufacturers. Since a longer acoustic channel may result in distortion to the sound waves being received by the user at ear-facing surface 132, the distorted sound may be further degraded as the sound waves travel through the hearing aid.

To address the potential problem that may exist in delivering sound waves to a user of hearing aid devices, some hearing aid devices allow the user to switch between sound wave mode and magnetic field mode. In the magnetic field mode, a telecoil (i.e., T-coil) within the hearing aid device is employed to pick-up the magnetic field being produced by audio transducer 128. In other words, the telecoil detects the magnetic field energy being emitted from audio transducer 128 and convert the detected magnetic energy into sound.

However, the magnetic field becomes weaker as the magnetic field lines travel away from its source. Thus, the magnetic field that may be picked up by the telecoil (as shown in FIG. 1B) is significantly weaker than the magnetic field of FIG. 1A since the acoustic channel is significantly longer. As a result, the sound that may be converted by the telecoil may be distorted or insufficiently loud/clear for proper comprehension. Thus, even though the length of mobile telephone 120 is shorter by placing audio transducer 128 behind display area 126, the longer acoustic channel causes distortion in the sound being emitted, thereby creating distorted sound which may result in a frustrating experience for the mobile telephone user, especially if the user requires the assistance of a hearing aid device.

SUMMARY

The invention relates, in an embodiment, to a mobile electronic device. The mobile electronic device includes a housing having an ear-facing surface. Also, the mobile electronic device includes an audio transducer, disposed within the housing. Further, the mobile electronic device includes an acoustic channel coupled between the audio transducer and the ear-facing surface for transmitting sound waves produced by the audio transducer to external of the ear-facing surface, wherein the audio-transducer having an audio-transmitting plane disposed at an angle other than parallel relative to the ear-facing surface.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1A:
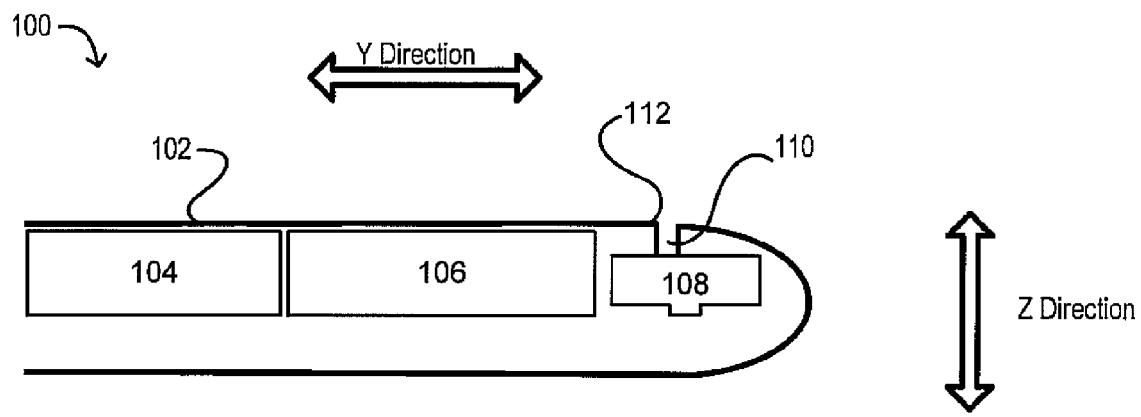
FIG. 1A shows a simple diagram of a cross-sectional view of a mobile telephone.
Figure 1B:
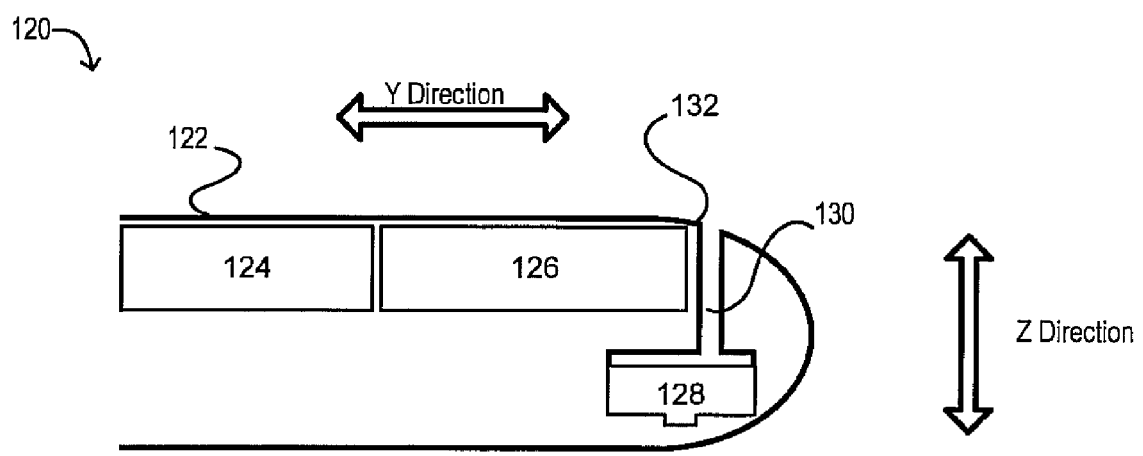
FIG. 1B shows another cross-sectional view of a mobile telephone.

As can be seen from FIGS. 1A and 1B, the audio transducer is usually arranged parallel to the ear-facing surface of a mobile device. The inventors herein realized that by placing the audio transducer at an angle that is not parallel to the ear-facing surface, the length of the mobile device may be shorten while still maintaining the sound quality. In accordance with embodiments of the invention, arrangements and method are provided for reducing the physical size of a portable electronic device without unduly degrading the user's audio experience.

In this document, various implementations will be discussed using mobile telephone as an example. This invention, however, is not limited to mobile telephone and may be applied to other portable electronic devices that may emit sound, including but are not limited to, internet tablet e-book device, personal digital assistant, and the like. Instead, the discussions are meant as examples and the invention is not limited by the examples presented.

In an embodiment of the invention, an angled sound-generation arrangement is provided. The angled sound-generation arrangement includes an audio transducer having an audio-transmitting plane that is positioned at an angle that is not parallel to the ear-facing surface of a portable electronic device. To elaborate, an audio transducer has an audio transmitting-plane, representing the plane from which sound waves travel orthogonally outward. A speaker, for example, has a plane (e.g., the speaker front) from which sound is projected outward. In this document, the position or angle of an audio transducer is discussed with reference to this audio-transmitting plane. In an example, the angled sound-generation arrangement may include the audio transducer being positioned (i.e., having its audio-transmitting plane positioned) at a forty-five degree angle. In another example, the audio transducer may be perpendicular to the ear-facing surface of the portable electronic device. As can be appreciated from the foregoing, the angles may vary and the examples discussed are not meant as a limitation to the invention.

By positioning the audio transducer at an angle not parallel to the ear-facing surface of the portable electronic device, the length of the portable electronic device may be reduced without having to significantly increase the length of the acoustic channel. As a result, sound waves may travel from the audio transducer to the ear-facing surface of the portable electronic device without experiencing a significant degradation in sound quality. Further, since the angled position of the audio transducer enables the audio transducer to be relatively close to the ear-facing surface, the magnetic field received by the telecoil (within the hearing aid device) remains relatively strong, thereby enabling the telecoil to convert the magnetic field into audible sound that meets the HAC standard.

The features and advantages of the present invention may be better understood with reference to the figures and discussions that follow.

Figure 2A:
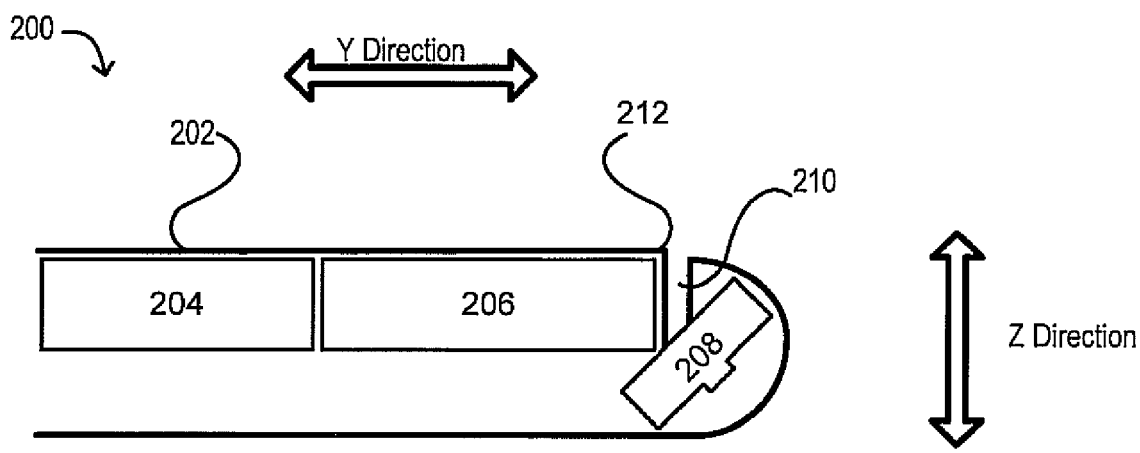
FIGS. 2A and 2B show, in an embodiment of the invention, different configurations for an angled sound-generation arrangement.
Figure 2B:
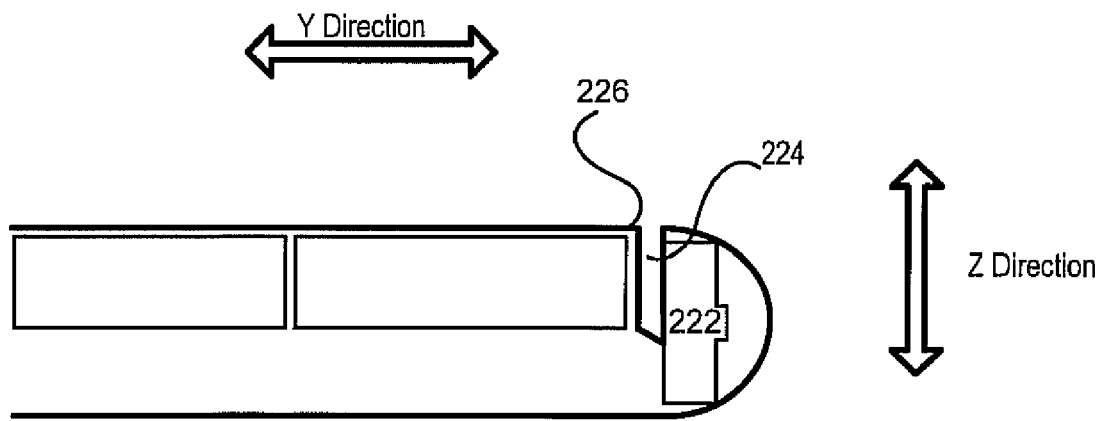

FIGS. 2A and 2B show, in an embodiment of the invention, different configurations for an angled sound-generation arrangement. The angled sound-generation arrangement may include a mobile device with a plurality of components. In an example, a mobile device 200 may include a plurality of components (such as a set of keys 204, a display area 206, and an audio transducer 208) encased within a device housing 202.

In an embodiment, the audio transducer is positioned at an angle not parallel to an ear-facing surface. In an example, FIG. 2A shows audio transducer 208 at a forty-five degree to an ear-facing surface 212. In another example, FIG. 2B shows an audio transducer 222 at a substantially vertical position (in relation to an ear-facing surface 226). As can be appreciated from the foregoing, the two configurations depicted in FIGS. 2A and 2B are examples of the different angles an audio transducer may be positioned within a mobile devices. The examples are meant as illustrations and are not meant to limit the invention.

As aforementioned, in the prior art, each component has a finite size that is required to enable the component to function properly. Given the finite size limitation of the components, the angled sound-generation arrangement provides an alternative solution for shortening the length of mobile device 200. In other words, since the audio transducer (208/222) is at an angle, less horizontal space is required to house the audio transducer. As a result, the length of the mobile device may be reduced. Additionally, other constraints (such as the outside shape of the mobile device or the positioning of other components) may create a space within the mobile device that may be better occupied by an audio transducer that is positioned at an angle. Thus, a manufacturer is able to satisfy the consumer's demand for small portable electronic devices without sacrificing functionality and design.

In addition, since the audio transducer (208/222) is positioned close to the ear-facing surface (212/226, respectively), the sound waves produced by the audio transducer does not have to travel a long distance to reach the ear-facing surface. Although the acoustic channel (210/224, respectively) may be slightly longer than the prior art acoustic channel 110 of FIG. 1A, the additional distance does not cause the sound quality to significantly degrade since the audio transducer (208/222) is still relatively close to the ear-facing surface (212/226, respectively).

Another advantage to the angled sound-generation arrangement is that the close proximity of the audio transducer (208/222) to the ear-facing surface (212/226, respectively) enables a substantially strong magnetic field, which is emitted by the audio transducer, to be received by a telecoil within a hearing aid device. In an embodiment well-know techniques in the art for shaping and directing a magnetic field may also be applied to guide the magnetic field toward the ear-facing surface. Given that the strength of the magnetic field received by the telecoil is relatively strong, the telecoil is better able to convert the magnetic field into sound that meet the HAC standard.

In an embodiment, additional power may be applied to the audio transducer to produce stronger sound waves and/or magnetic field. However, the application of additional power to the audio transducer may amplify the resonance and/or distortion that may exist and/or reduce the battery life. As a result, additional power is not always an available option.

Since angled sound-generation arrangement places the audio transducer (208/222) relatively close to the ear-facing surface, the distance is relatively short. Thus, additional power that is applied to the audio transducer amplifies the sound waves and/or magnetic field to a greater degree without causing a significant increase in the resonance and/or distortion. In comparison, additional power to an audio transducer (such as audio transducer 128 of FIG. 1B) that is already experiencing significant resonance/distortion due to a long acoustic channel may result in a significant augmentation of the resonance/distortion, thereby resulting in a very unpleasant sound to the user of the mobile device.

Figure 3:
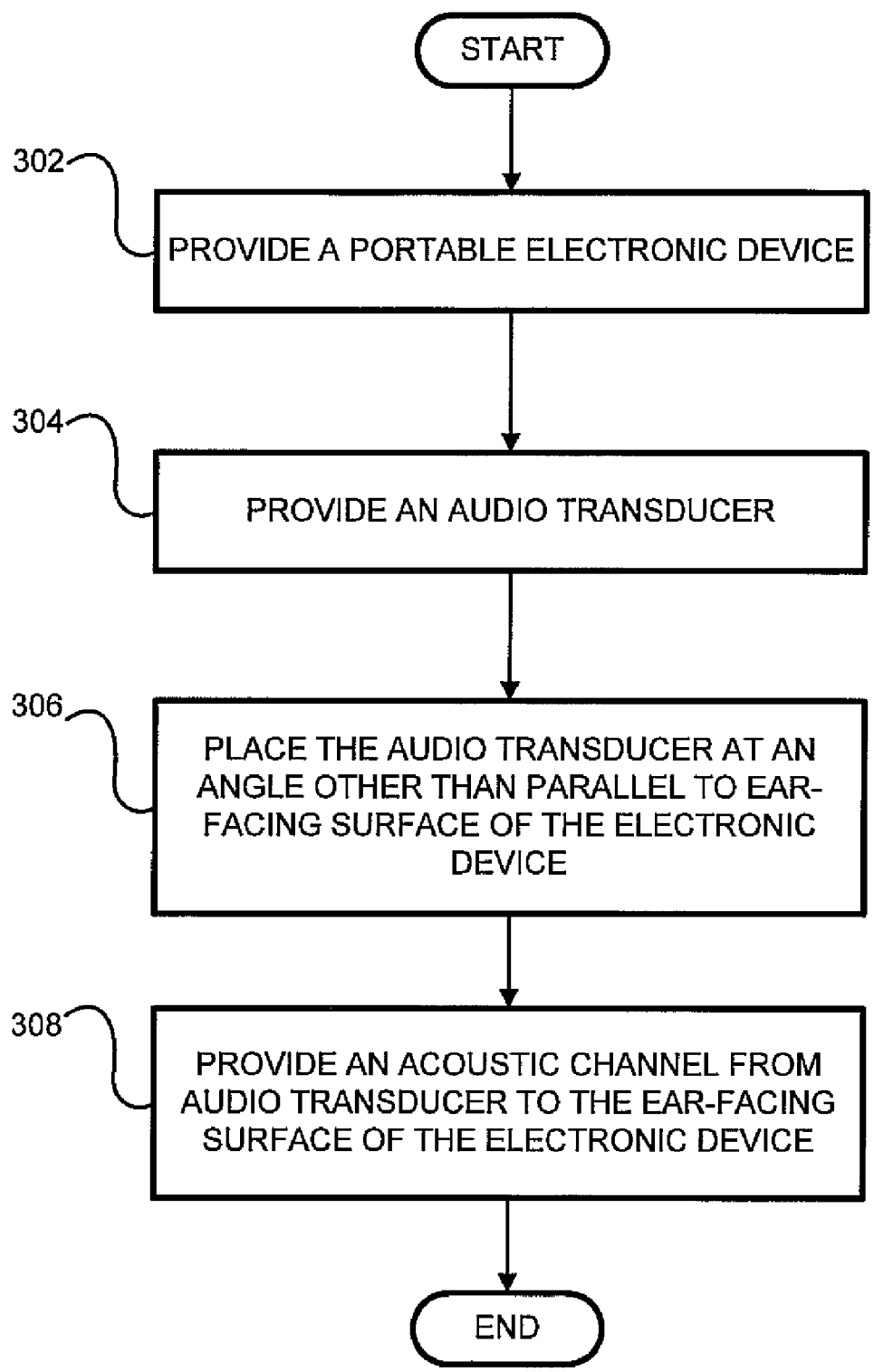
FIG. 3 shows, in an embodiment of the invention, a simple flow chart illustrating the steps for manufacturing the mobile device with an angled sound-generation arrangement.

FIG. 3 shows, in an embodiment of the invention, a simple flow chart illustrating the steps for manufacturing an angled sound-generation arrangement.

At a first step 302, a portable electronic device is provided. The portable electronic device may be any electronic device that may emit sound. Examples of portable electronic device may include, but are not limited to, mobile telephone, internet tablet, personal digital assistant, and the like.

At a next step 304, an audio transducer is provided.

At a next step 306, the audio transducer is positioned at an angle other than parallel to an ear-facing surface of the portable electronic device. As shown in FIGS. 1A and 2B, the angle may vary. By placing the audio transducer at an angle, the form factor of the portable electronic device may be reduced and the outside form of the mobile device may better match the desired shape.

At a next step 308, an acoustic channel is provided. The acoustic channel allows the sound waves and/or magnetic field to travel from the audio transducer to the ear-facing surface of the portable electronic device. As aforementioned, the length of the acoustic channel is a factor in determining the strength of the sound emitted from the mobile device. Given that all conditions are the same, a portable electronic device with a shorter acoustic channel provides a better acoustic experience for the user.

As can be appreciated from the forgoing, one or more embodiments of the present invention provide for an angled sound-generation arrangement. With the angled sound-generation arrangement, demands by consumers for smaller portable electronic devices may be satisfy without sacrificing functionality. Further, the angled sound-generation arrangement provides the manufacturer with a distinct market advantage without incurring additional expenses.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

The invention claimed is:

1. A mobile electronic device comprising:
   a housing having an ear-facing surface;
   an audio transducer disposed within said housing; and
   an acoustic channel coupled between said audio transducer and said ear-facing surface for transmitting sound waves produced by said audio transducer to external of said ear-facing surface, wherein said audio-transducer having an audio-transmitting plane disposed at an angle other than parallel relative to said ear-facing surface.

2. The mobile electronic device of claim 1 wherein said mobile electronic device is a mobile telephone.

3. The mobile electronic device of claim 1 wherein said mobile electronic device is a personal digital assistant.

4. The mobile electronic device of claim 1 wherein said mobile electronic device is an internet tablet.

5. The mobile electronic device of claim 1 wherein said audio-transmitting plane of said audio transducer is at a less-than ninety degree angle relative to said ear-facing surface of said mobile electronic device.

6. The mobile electronic device of claim 1 wherein said audio-transmitting plane of said audio transducer is at a forty-five degree angle relative to said ear-facing surface of said mobile electronic device.

7. The mobile electronic device of claim 1 wherein said audio-transmitting plane of said audio transducer is perpendicular to said ear-facing surface of said mobile electronic device.

8. The mobile electronic device of claim 1 wherein a magnetic field produced by said audio transducer is shaped using a magnetic-field shaping component to guide said magnetic field toward said ear-facing surface.

9. A method for creating a mobile electronic device, comprising:
    providing a housing having at least an ear-facing surface and an acoustic channel;
    providing an audio transducer; and
    arranging said audio transducer at a position in which an audio-transmitting plane of said audio transducer is at an angle other than parallel relative to said ear-facing surface, wherein said audio transducer is disposed within said housing and said acoustic channel is positioned between said audio transducer and said ear-facing surface for transmitting sound waves produced by said audio transducer to external of said ear-facing surface.

10. The method of claim 9 wherein said mobile electronic device is a mobile telephone.

11. The method of claim 9 wherein said audio-transmitting plane of said audio transducer is at a less-than ninety degree angle relative to said ear-facing surface of said mobile electronic device.

12. The method of claim 9 wherein said audio-transmitting plane of said audio transducer is at a forty-five degree angle relative to said ear-facing surface of said mobile electronic device.

13. The method of claim 9 wherein said audio-transmitting plane of said audio transducer is perpendicular to said ear-facing surface of said mobile electronic device.

14. The method of claim 9 further including shaping a magnetic field produced by said audio transducer using a magnetic-field shaping component to guide said magnetic field toward said ear-facing surface.

15. A mobile electronic device, comprising:
    housing means;
    means for producing sound; and
    means for transmitting sound from said means for producing sound to external of an ear-facing surface of said housing means, wherein an audio-transmitting plane of said means for producing sound is at an angle other than parallel relative to said ear-facing surface of said housing means.

16. The mobile electronic device of claim 15 wherein said means for producing sound is an audio transducer.

17. The mobile electronic device of claim 15 wherein said means for transmitting sound is an acoustic channel.

18. The mobile electronic device of claim 15 wherein said audio-transmitting plane of said means for producing sound is at a forty-five degree angle relative to said ear-facing surface of said mobile electronic device.

19. The mobile electronic device of claim 15 wherein said audio-transmitting plane of said means for producing sound is perpendicular to said ear-facing surface of said mobile electronic device.

20. The mobile electronic device of claim 15 further including means for shaping a magnetic field generated by said means for producing sound.

* * * * *